(12) United States Patent
Bédard et al.

(10) Patent No.: US 9,840,611 B2
(45) Date of Patent: *Dec. 12, 2017

(54) RUBBER COMPOSITIONS AND USES THEREOF

(71) Applicant: SOUCY TECHNO INC., Sherbrooke (CA)

(72) Inventors: François Bédard, Sherbrooke (CA); Denis Dubé, Sherbrooke (CA); Lyle MacDonald, Sherbrooke (CA); Jean-Damien Coué, Sherbrooke (CA)

(73) Assignee: SOUCY TECHNO INC., Sherbrooke (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/028,433

(22) PCT Filed: Oct. 20, 2014

(86) PCT No.: PCT/CA2014/000756
§ 371 (c)(1),
(2) Date: Apr. 10, 2016

(87) PCT Pub. No.: WO2015/054779
PCT Pub. Date: Apr. 23, 2015

(65) Prior Publication Data
US 2016/0272793 A1     Sep. 22, 2016

Related U.S. Application Data

(60) Provisional application No. 61/892,559, filed on Oct. 18, 2013.

(51) Int. Cl.
| | | |
|---|---|---|
| C08L 9/02 | (2006.01) | |
| C08K 3/04 | (2006.01) | |
| C08K 3/36 | (2006.01) | |
| C08K 7/02 | (2006.01) | |
| C08K 7/24 | (2006.01) | |

(52) U.S. Cl.
CPC ........ *C08L 9/02* (2013.01); *C08K 3/04* (2013.01); *C08K 3/36* (2013.01); *C08K 7/02* (2013.01); *C08K 7/24* (2013.01)

(58) Field of Classification Search
CPC .... C08L 9/02; C08K 7/02; C08K 7/24; C08K 3/04; C08K 3/36
See application file for complete search history.

(56) References Cited

U.S. PATENT DOCUMENTS

| | | | |
|---|---|---|---|
| 4,587,280 A | 5/1986 | Guha et al. | |
| 6,359,045 B1 | 3/2002 | Jeske et al. | |
| 7,244,407 B2 | 7/2007 | Chen et al. | |
| 7,785,669 B2 | 8/2010 | Wang et al. | |
| 8,329,257 B2 | 12/2012 | Larouche et al. | |
| 8,535,570 B2 | 9/2013 | Hermant et al. | |
| 8,920,682 B2 | 12/2014 | Texter | |
| 2004/0173295 A1 | 9/2004 | Zanzig et al. | |
| 2006/0142455 A1 | 6/2006 | Agarwal et al. | |
| 2006/0290070 A1* | 12/2006 | Park ................... | F16J 15/3284 277/559 |
| 2007/0255002 A1 | 11/2007 | Alba | |
| 2009/0202764 A1 | 8/2009 | Tonon et al. | |
| 2009/0208708 A1 | 8/2009 | Wei et al. | |
| 2009/0224598 A1 | 9/2009 | St-Amant et al. | |
| 2010/0122642 A1 | 5/2010 | Farrugia et al. | |
| 2010/0124713 A1 | 5/2010 | Farrugia et al. | |
| 2010/0184346 A1 | 7/2010 | Qi et al. | |
| 2010/0234514 A1 | 9/2010 | Noguchi et al. | |
| 2011/0014466 A1 | 1/2011 | Hu et al. | |
| 2011/0146859 A1 | 6/2011 | Schmitz et al. | |
| 2011/0156355 A1 | 6/2011 | Noguchi et al. | |
| 2012/0112133 A1 | 5/2012 | Bahnmüller et al. | |
| 2012/0183770 A1 | 7/2012 | Bosnyak et al. | |
| 2012/0207525 A1 | 8/2012 | Kim et al. | |
| 2013/0261221 A1 | 10/2013 | Bosnyak et al. | |
| 2013/0261246 A1* | 10/2013 | Ong .................... | C08K 7/24 524/495 |
| 2013/0281612 A1 | 10/2013 | Bosnyak et al. | |
| 2013/0341538 A1 | 12/2013 | Huang | |

FOREIGN PATENT DOCUMENTS

| | | |
|---|---|---|
| CA | 1338446 | 7/1987 |
| CA | 1339435 | 11/1987 |

(Continued)

OTHER PUBLICATIONS

English Abstract of CN1304473(C), "Natural liquid slurry with added carbon nanotube and its prepn process", published on Mar. 14, 2007.
English Abstract of CN101239801(A), "Preparation of carbon nano-tube/cement self-enhancing damping composite material damping ratio testing method", published on Aug. 13, 2008.
English Abstract of CN101418089(A), "Method for preparing natural rubber-carbon nano tube composite material by using static electricity self-assembly", published on Apr. 29, 2009.

(Continued)

*Primary Examiner* — Robert Jones, Jr.
(74) *Attorney, Agent, or Firm* — Bereskin & Parr LLP/S.E.N.C.R.L., s.r.l.

(57) ABSTRACT

There are provided rubber compositions comprising an elastomer comprising a rubber chosen from acrylonitrile-butadiene, hydrogenated acrylonitrile-butadiene, carboxylated acrylonitrile-butadiene and mixtures thereof; reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, the nanometric filamentary structures being functionalized or unfunctionalized; and a filler chosen from carbon black and silica. These compositions can be cured or uncured and they can be used for preparing various articles. Methods for preparing such compositions are also disclosed.

21 Claims, No Drawings

(56) References Cited

FOREIGN PATENT DOCUMENTS

| | | |
|---|---|---|
| CA | 1337834 | 12/1988 |
| CA | 1338304 | 1/1989 |
| CA | 2081636 | 5/1993 |
| CA | 2122347 | 5/1993 |
| CA | 2084117 | 9/1993 |
| CA | 2094476 | 10/1993 |
| CA | 2110285 | 10/1993 |
| CA | 2097464 | 12/1993 |
| CA | 2101129 | 1/1994 |
| CA | 2100979 | 2/1994 |
| CA | 2106795 | 3/1994 |
| CA | 2088814 | 4/1994 |
| CA | 2088817 | 4/1994 |
| CA | 2109279 | 5/1994 |
| CA | 2109663 | 6/1994 |
| CA | 2110789 | 6/1994 |
| CA | 2111143 | 6/1994 |
| CA | 2111615 | 7/1994 |
| CA | 2113743 | 8/1994 |
| CA | 2105334 | 10/1994 |
| CA | 2160535 | 10/1994 |
| CA | 2104528 | 11/1994 |
| CA | 2163209 | 11/1994 |
| CA | 2104529 | 12/1994 |
| CA | 2104537 | 12/1994 |
| CA | 2166681 | 1/1995 |
| CA | 2108772 | 2/1995 |
| CA | 2108763 | 3/1995 |
| CA | 2118778 | 3/1995 |
| CA | 2171466 | 3/1995 |
| CA | 2144933 | 9/1995 |
| CA | 2145736 | 10/1995 |
| CA | 2145810 | 10/1995 |
| CA | 2125736 | 11/1995 |
| CA | 2129281 | 11/1995 |
| CA | 2189235 | 11/1995 |
| CA | 2143129 | 1/1996 |
| CA | 2144560 | 1/1996 |
| CA | 2195226 | 2/1996 |
| CA | 2134834 | 3/1996 |
| CA | 2138609 | 3/1996 |
| CA | 2138726 | 3/1996 |
| CA | 2207544 | 6/1996 |
| CA | 2154633 | 7/1996 |
| CA | 2166568 | 7/1996 |
| CA | 2154636 | 9/1996 |
| CA | 2154859 | 9/1996 |
| CA | 2160637 | 9/1996 |
| CA | 2171392 | 10/1996 |
| CA | 2171393 | 10/1996 |
| CA | 2173550 | 10/1996 |
| CA | 2158107 | 11/1996 |
| CA | 2221573 | 11/1996 |
| CA | 2158003 | 12/1996 |
| CA | 2160324 | 12/1996 |
| CA | 2160333 | 12/1996 |
| CA | 2157260 | 3/1997 |
| CA | 2184744 | 3/1997 |
| CA | 2184932 | 3/1997 |
| CA | 2194639 | 8/1997 |
| CA | 2180699 | 9/1997 |
| CA | 2180898 | 9/1997 |
| CA | 2181428 | 9/1997 |
| CA | 2203617 | 10/1997 |
| CA | 2253548 | 11/1997 |
| CA | 2207530 | 12/1997 |
| CA | 2201440 | 1/1998 |
| CA | 2209449 | 3/1998 |
| CA | 2206280 | 5/1998 |
| CA | 2228987 | 9/1998 |
| CA | 2230624 | 9/1998 |
| CA | 2234815 | 10/1998 |
| CA | 2236991 | 11/1998 |
| CA | 2241793 | 1/1999 |
| CA | 2244796 | 2/1999 |
| CA | 2245355 | 3/1999 |
| CA | 2245770 | 3/1999 |
| CA | 2246038 | 3/1999 |
| CA | 2257002 | 6/1999 |
| CA | 2310131 | 6/1999 |
| CA | 2260340 | 7/1999 |
| CA | 2260924 | 9/1999 |
| CA | 2272375 | 12/1999 |
| CA | 2318756 | 6/2000 |
| CA | 2296804 | 9/2000 |
| CA | 2297505 | 9/2000 |
| CA | 2301788 | 11/2000 |
| CA | 2309287 | 12/2000 |
| CA | 2312452 | 3/2001 |
| CA | 2314015 | 3/2001 |
| CA | 2314017 | 3/2001 |
| CA | 2316011 | 4/2001 |
| CA | 2338954 | 8/2001 |
| CA | 2368002 | 8/2001 |
| CA | 2408824 | 11/2001 |
| CA | 2352927 | 1/2002 |
| CA | 2353664 | 1/2002 |
| CA | 2417681 | 2/2002 |
| CA | 2442965 | 4/2002 |
| CA | 2443249 | 4/2002 |
| CA | 2369237 | 7/2002 |
| CA | 2364723 | 8/2002 |
| CA | 2364781 | 8/2002 |
| CA | 2441330 | 10/2002 |
| CA | 2385205 | 11/2002 |
| CA | 2423187 | 11/2002 |
| CA | 2394454 | 3/2003 |
| CA | 2459377 | 3/2003 |
| CA | 2423498 | 9/2003 |
| CA | 2509699 | 7/2004 |
| CA | 2515895 | 8/2004 |
| CA | 2469106 | 11/2004 |
| CA | 2469693 | 12/2004 |
| CA | 2530471 | 2/2005 |
| CA | 2544592 | 5/2005 |
| CA | 2491190 | 8/2005 |
| CA | 2591942 | 7/2006 |
| CA | 2593476 | 7/2006 |
| CA | 2620452 | 2/2007 |
| CA | 2620682 | 3/2007 |
| CA | 2658970 | 12/2007 |
| CA | 2674053 | 7/2008 |
| CA | 2679037 | 8/2008 |
| CA | 2645610 | 5/2009 |
| CA | 2670145 | 12/2009 |
| CA | 2746026 | 7/2010 |
| CA | 2770878 | 3/2011 |
| CA | 2784412 | 6/2011 |
| CA | 2784438 | 6/2011 |
| CA | 2821074 | 6/2012 |
| CN | 100344441 C | 10/2007 |
| CN | 101735492 A | 6/2010 |
| CN | 102585349 A | 7/2012 |
| EP | 2138535 | 12/2011 |
| GB | 2484338 | 4/2012 |
| WO | 03060002 | 7/2003 |
| WO | 2004097853 | 11/2004 |
| WO | 2005037710 | 4/2005 |
| WO | WO2009155728 A1 * | 12/2009 |
| WO | 2014032172 | 3/2014 |
| WO | 2015054779 | 4/2015 |
| WO | 2015089647 | 6/2015 |

OTHER PUBLICATIONS

English Abstract of CN102061015(A), "Heat conducting susceptibility latex product and preparation and method thereof", published on May 18, 2011.
English Abstract of CN102417610(A), "Graphene/carbon nanotube hybrid polymer composite material", published on Apr. 18, 2012.
English Abstract of EP2436720(A1), "Method for producing master batches containing nanoparticles", published on Apr. 4, 2012.

(56) References Cited

OTHER PUBLICATIONS

English Abstract of FR2945802(A1), "Carbon nanotube carpet", published on Nov. 26, 2010.
English Abstract of JP2004101958(A), "Conductive Member and Manufacturing Method Therefor", published on Apr. 2, 2004.
English Abstract of JP2004210830(A), "Elastomer Composition and Method for Producing the Same", published on Jul. 29, 2004.
Botros et al., "Effect of fiber reinforcement on thermal stability and swelling behavior of CR/NBR blends", Polymer-Plastics Technology and Engineering, vol. 39(2), pp. 393-414, Jan. 2000.
English Abstract of CN101602867(A), "Modified chloroprene rubber V band and method for preparing same", published on Dec. 16, 2009.
English Abstract of CN103923423(A), "Rubber compound resistant to fatigue and aging", published on Jul. 16, 2014.
Ryu et al., "Effects of Fiber Aspect Ratio, Fiber Content, and Bonding Agent on Tensile and Tear Properties of Short-Fiber Reinforced Rubber", KSME International Journal, vol. 15(1), pp. 35-43, Dec. 2001.
Uchiyama et al., "Friction of Short-Fiber-Reinforced Rubber on Wet Surfaces", Journal of Applied Polymer Science, vol. 95, pp. 82-89, Apr. 2005.
Wada et al., "Friction and wear of short-fibre-reinforced rubber composites under various sliding speeds and loads", Wear, vol. 162-164, pp. 930-938, Jan. 1993.
Watson et al., "Elastomer reinforcement with short Kevlar aramid fiber for wear applications", Rubber World, vol. 198 (5), Aug. 2008.
English Abstract of CN102634092(A), "Fiber filled anti-ablation hydrogenated nitrile-butadiene rubber", published on Aug. 15, 2012.
Wang, "The thermal resistance, flame retardance, and smoke control mechanism of nano MH/GF/NBR composite material", Science and Engineering of Composite Materials, vol. 21(3), pp. 309-314, First published online on Oct. 2, 2013.
Wang, "Thermo-oxidative ageing and stability studies of different magnesium hydroxide/glass fiber/nitrile butadiene rubber nanocomposites", Proceedings of the Institution of Mechanical Engineers, Part L: Journal of Materials Design and Applications, vol. 0(0), pp. 1-7, First published online on Oct. 15, 2014.
English Abstract of CN101381483(A), "Method for preparing carbon nanotube-natural rubber compound material", Published on Mar. 11, 2009.
English Abstract of CN101831090(A), "High-performance natural rubber vulcanized rubber of carbon-containing nanotube, and preparation method thereof", Published on Sep. 15, 2010.
English Abstract of CN102321279(A), "Dopamine modified carbon nanotube/rubber material and preparation method thereof", Published on Jan. 18, 2012.
English abstract of CN102516608(A), "One high wear-resisting outstanding dynamic property nano rare earth inorganic substance/rubber compound materials", Published on Jun. 27, 2012.
English Abstract of JP2006083249(A), "Method for producing dispersed solution of rubber composition mixed with nano carbon", Published on Mar. 30, 2006.
English Abstract of JP2009046547(A), "Rubber Composition for Tire", Published on Mar. 5, 2009.
English Abstract of JP2010058740(A), "Pneumatic Tire", Published on Mar. 18, 2010.
English Abstract of JP2012126853(A), "Rubber Particulate Highly Blended Carbon Nanotubes, and Method for Producing the Same", Published on Jul. 5, 2012.
English Abstract of KR100635603(B1), "Bladder Rubbed Composition with High Heat Conductivity for Curing Tire", Published on Oct. 11, 2006.
English Abstract of KR100635604(B1), "Tire Tread Rubber Composition for Improving Wear Resistance Property", Published on Oct. 18, 2006.
English Abstract of KR100705784(B1), "Rubber Composition for Tire Apex that Comprises Base Rubber, Carbon Nanotubes and Wood Powder", Published on Apr. 3, 2007.
English Abstract of KR100827320(B1), "Belt Rubber Composition for Tire", Published on May 7, 2008.
English Abstract of KR100879219(B1), "Fabrication of Polymer/Carbon Nanotubes Nanocomposite by Latex Aggregation", Published on Jan. 16, 2009.
English Translation of CN103923423A, "Rubber Compound Resistant to Fatigue and Aging", Published on Jul. 16, 2014.
Wang, "The termal resistance, flame retardance, and smoke control mechanism of nano MH/NBR composite material", Sci Eng Compos Mater 2014; 21(3): 309-314.
Abstract Sui et al., "Preparation and Properties of Natural Rubber Composites Reinforced with Pretreated Carbon Nanotubes", Published on Mar. 16, 2008.
Abstract Yue et al., "Study on Preparation and Properties of Carbon Nanotubes/Rubber Composites", Published on Apr. 2006.
Bokobza et al., "Blends of Carbon and Multiwall Carbon Nanotubes as Reinforcing Fillers for Hydrocarbon Rubbers", Journal of Polymer Science: Part B: Polymer Physics, vol. 46, 1939-1951 (2008).
Claims of CA2193183, "Vulcanisable Rubber Compositions for the Production of Vehicle Tyres", Published on Jun. 21, 1997.
Davey, "Development of Carbon Nanotube/Carbon Fiber Multiscale Reinforcement Composites", A Thesis submitted to the Department of Industrial Engineering in partial fulfillment of the Requirements for the degree of Master of Science, Fall Semester, 2005.
Ahmad et al., "Reinforced Thermoplastic Natural Rubber (TPNR) Composites with Different Types of Carbon Nanotubes (MWNTS)", Published online on Jul. 20, 2011.
Koning et al., "Polymer Carbon Nanotube Composites—The Polymer Latex Concepts", Published on Apr. 30, 2012.
Mathew et al, "Hybrid Composite Based on Nanosilica, Nylon 6 Short Fibre, and Styrene Butadiene Rubber—a Study on the Effect of Fillers and Bonding Agent", Progress in Rubber, Plastics and Recycling Technology, vol. 26, No. 1, 2010.
O'Connor, "Short-Fiber-Reinforced Elastomer Composites", Rubber Chemistry and Technology, Nov. 1977, vol. 50, No. 5, pp. 945-958.
Praveen et al., "Effect of nanoclay on the mechanical and damping properties of aramid short fibre-filled styrene butadiene rubber composites", Published online in Wiley Interscience: Oct. 19, 2009.
Praveen et al., "Synergistic effect of carbon black and nanoclay fillers in styrene butadiene rubber matrix: Development of dual structure", Composites: Part A 40 (2009) 309-316.
Sui et al., "Preparation and properties of natural rubber composites reinforced with pretreated carbon nanotubes", Polym. Adv. Technol. (2008).
Michael Graham Richard/Tree Hugger, "Rubber Tracks Make Military Vehicles More Efficient, Durable, and Quieter", Published on Dec. 15, 2008.
English Translation of CN101735492A, "Engineering Tire Tread Rubber", Published on Jun. 16, 2010.
English Translation of CN101602867B, "Modified Chloroprene Rubber V Band and Method for Preparing Same", Published on Apr. 13, 2011.
Botros et al., "Effect of Fiber Reinforcement on Thermal Stability and Swelling Behavior of CR/NBR Blends", Polym.-Plast. Technol. Eng., 39(2), 393-414 (2000).
Cataldo et al., "A Comparative Study on the Reinforcing Effect of Aramide and PET Short Fibers in a Natural Rubber-Based Composite", Journal of Macromolecular Science, Part B: Physics, 48:1241-1251, 2009.
Mathew et al., "Hybrid Composite Based on Nanosilica, Nylon 6 Short Fibre, and Styrene Butadiene Rubber—a Study on the Effect of Fillers and Bonding Agent", Progress in Rubber, Plastics and Recycling Technology, vol. 26, No. 1, 2010.
O'Connor, "Short-Fiber-Reinforced Elastomer Composites", Rubber Chemistry and Technology, vol. 50(5), 945-958, 1977.
Bokobza et al., "Blends of Carbon Blacks and Multiwall Carbon Nanotubes as Reinforcing Fillers for Hydrocarbon Rubbers", Journal of Polymer Science Part B: Polymer Physics, vol. 46(18) 1939-1951, 2008.

(56) References Cited

OTHER PUBLICATIONS

Praveen et al., "Effects of nanoclay on the mechanical and damping properties of aramid short fibre-filled styrene butadiene rubber composites", Polymer International, vol. 59(2), 187-197, 2010.

* cited by examiner

RUBBER COMPOSITIONS AND USES THEREOF

The present application is a 35 USC 371 national stage entry of PCT/CA2014/000756 filed on Oct. 20, 2014 and which claims priority of US 61/892,559 filed on Oct. 18, 2013. These documents are hereby incorporated by reference in their entirety.

The present disclosure relates to improvements in the field of chemistry applied to rubber compositions. For example, such rubber compositions can be useful for preparing various articles for example used in the field of oil and gas industry as well as in the field of mining industry.

So far, rubber compositions have been developed for uses made under difficult or harsh conditions. This is the case, for example, for articles used in oil and gas industries and mining industries.

Some technologies require rubber articles that show outstanding resistance properties to oil, heat, pressure and abrasion. For examples, the rubber articles can be in contact with oil and abrasives such as and at depths as far as 3000 meters down in earth.

Unfortunately, the solutions proposed so far are most of the time either too expensive or not reliable.

There would thus be a need to develop new rubber composition effective for preparing rubber articles that would exhibit better durability in presence oil and abrasives. There would also be a need to develop compositions effective for preparing rubber articles showing the same (or better) level of durability than the standard compositions but that can be made at lower costs.

There is however still a need for providing an alternative to the existing solutions for preparing rubber compositions.

According to one aspect, there is provided a rubber composition comprising:
 an elastomer;
 reinforcing fibers and/or nanometric filamentary structures; and
 a filler.

According to another aspect, there is provided a rubber composition comprising:
 an elastomer;
 reinforcing fibers and/or nanometric filamentary structures; and
 a filler,
 wherein the composition is an uncured rubber composition.

According to another aspect, there is provided a rubber composition comprising:
 an elastomer;
 reinforcing fibers and/or nanometric filamentary structures; and
 a filler,
 wherein the composition is a cured rubber composition.

According to another aspect, there is provided a rubber composition comprising:
 about 45 to about 70 wt. % of an elastomer;
 about 0.1 to about 10 wt. % of reinforcing fibers and/or nanometric filamentary structures; and
 about 15 to about 40 wt. % of a filler.

According to another aspect, there is provided a rubber composition comprising:
 about 45 to about 70 wt. % of an elastomer;
 about 0.1 to about 10 wt. % of reinforcing fibers and/or nanometric filamentary structures; and
 about 15 to about 40 wt. % of a filler. wherein the composition is an uncured rubber composition.

According to another aspect, there is provided a rubber composition comprising:
 about 45 to about 70 wt. % of an elastomer;
 about 0.1 to about 10 wt. % of reinforcing fibers and/or nanometric filamentary structures; and
 about 15 to about 40 wt. % of a filler.
 wherein the composition is a cured rubber composition.

According to another aspect, there is provided a rubber composition comprising:
 about 30 to about 85 wt. % of an elastomer;
 about 0.1 to about 10 wt. % of reinforcing fibers and/or nanometric filamentary structures; and
 about 15 to about 40 wt. % of a filler.

According to another aspect, there is provided a rubber composition comprising:
 about 30 to about 85 wt. % of an elastomer;
 about 0.1 to about 10 wt. % of reinforcing fibers and/or nanometric filamentary structures; and
 about 15 to about 40 wt. % of a filler.
 wherein the composition is an uncured rubber composition.

According to another aspect, there is provided a rubber composition comprising:
 about 30 to about 85 wt. % of an elastomer;
 about 0.1 to about 10 wt. % of reinforcing fibers and/or nanometric filamentary structures; and
 about 15 to about 40 wt. % of a filler.
 wherein the composition is a cured rubber composition.

According to another aspect, there is provided a rubber composition comprising:
 an elastomer comprising a rubber chosen from acrylonitrile-butadiene polymer, hydrogenated acrylonitrile-butadiene polymer, carboxylated acrylonitrile-butadiene polymer and mixtures thereof;
 reinforcing fibers and/or nanometric filamentary structures; and
 a filler.

According to another aspect, there is provided a rubber composition comprising:
 an elastomer comprising a rubber chosen from hydrogenated acrylonitrile-butadiene polymer, carboxylated acrylonitrile-butadiene polymer and mixtures thereof;
 reinforcing fibers and/or nanometric filamentary structures; and
 a filler.

According to another aspect, there is provided a rubber composition comprising:
 an elastomer comprising a rubber chosen from acrylonitrile-butadiene polymer, hydrogenated acrylonitrile-butadiene polymer, carboxylated acrylonitrile-butadiene polymer and mixtures thereof;
 reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, the nanometric filamentary structures being functionalized or unfunctionalized; and a filler chosen from carbon black and silica.

According to another aspect, there is provided a rubber composition comprising:
 an elastomer comprising a rubber chosen from hydrogenated acrylonitrile-butadiene polymer, carboxylated acrylonitrile-butadiene polymer and mixtures thereof;
 reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, the nanometric filamentary structures being functionalized or unfunctionalized; and a filler chosen from carbon black and silica.

It was found that such compositions were effective for preparing various articles at low costs. In fact, these compositions allowed for preparing articles having the desired properties for various uses, while allowing for simple preparation processes at low costs. Moreover, these compositions were found to effective for preparing rubber articles showing improved and superior characteristics over articles made by prior art compositions.

In the following drawings, which represent by way of examples only, various embodiments of the disclosure.

Further features and advantages will become more readily apparent from the following description of various embodiments as illustrated by way of examples.

The expression "nanometric filamentary structures" as used herein refers to structures having a high dipole moment when they are charged since such nanometric structures have a high aspect ratio (length/diameter), which can be, for example, above 10. For example, they have a diameter that is inferior to about 100 nm, which allows a significant increase in the local electric field at the tip or the surface of the structures, so that they can readily emit electrons by the field or Schottky emission effect.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "wt %" as used herein when describing an ingredient present in a composition, refers to the weight % of this ingredient based on the total weight of the composition.

For example, in the composition, the elastomer, reinforcing fibers and/or nanometric filamentary structures and filler can be substantially uniformly distributed.

For example, the elastomer can comprise a rubber chosen from acrylonitrile-butadiene polymer (NBR), hydrogenated acrylonitrile-butadiene polymer (HNBR), carboxylated acrylonitrile-butadiene polymer (XNBR) and mixtures thereof.

For example, the elastomer can comprise a rubber that is acrylonitrile-butadiene polymer (NBR).

For example, the elastomer can comprise a rubber that is hydrogenated acrylonitrile-butadiene polymer (HNBR).

For example, the elastomer can comprise a rubber that is carboxylated acrylonitrile-butadiene polymer (XNBR).

For example, the elastomer can comprise about 25 to about 60 wt. %, about 30 to about 55 wt. %, about 40 to about 60 wt. %, about 45 to about 55 wt. %, about 40 to about 50 wt. % or about 46 to about 52 wt. % of acrylonitrile.

For example, the reinforcing fibers can be chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof.

For example, the nanometric filamentary structures can be functionalized or unfunctionalized.

For example, the filler can be chosen from carbon black and silica, and a mixture thereof.

For example, the filler can be chosen from carbon black and silica, bis (triethoxysilylpropyl) polysulfide, and mixtures thereof.

For example, the composition can comprise about 30 to about 85 wt. % of the elastomer, about 35 to about 80 wt. %, about 45 to about 70 wt. % of the elastomer, about 50 to about 65 wt. % of the elastomer, about 55 to about 60 wt. % of the elastomer, about 52 to about 61 wt. % of the elastomer, about 50 to about 55 wt. % of the elastomer, about 52 to about 54 wt. % of the elastomer, about 40 to about 60 wt. % of the elastomer, about 57 to about 59 wt. % of the elastomer, about 40 to about 55 wt. % of the elastomer, or about 42 to about 48 wt. % of the elastomer.

For example, the composition can comprise about 0.1 to about 10 wt. %, about 0.1 to about 3 wt. %, about 0.25 to about 1.75 wt, about 0.5 to about 1.5 wt. %, or about 0.75 to about 1.25 wt. % of the reinforcing fibers.

For example, the composition can comprise about 0.1 to about 10 wt. %, about 0.1 to about 3 wt. %, about 0.25 to about 1.75 wt. %, about 0.5 to about 1.5 wt. % or about 0.75 to about 1.25 wt. % of the nanometric filamentary structures.

For example, the composition can comprise about 0.1 to about 10 wt. % of the reinforcing fibers and/or nanometric filamentary structures.

For example, the composition can comprise about 0.5 to about 10 wt. % of the reinforcing fibers and/or nanometric filamentary structures.

For example, the composition can comprise about 1 to about 5 wt. % of the reinforcing fibers and/or nanometric filamentary structures.

For example, the composition can comprise about 1 to about 3 wt. % of the reinforcing fibers and/or nanometric filamentary structures.

For example, the nanometric filamentary structures can comprise nanowires, nanorods, nanofibers, nanoribbons, nanotubes or bundles thereof, or mixtures thereof.

For example, the nanometric filamentary structures can comprise functionalized nanowires, functionalized nanorods, functionalized nanofibers, functionalized nanoribbons, functionalized nanotubes or bundles thereof, or mixtures thereof.

For example, the nanometric filamentary structures can be chosen from single-wall carbon nanotubes (SWCNT), functionalized single-wall carbon nanotubes, multi-wall carbon nanotubes (MWCNT), functionalized multi-wall carbon nanotubes, carbon nanometric fibres, functionalized carbon nanometric fibres and mixtures thereof.

For example, the nanometric filamentary structures can comprise a member chosen from of C, BN, B, Si, Ge, Bi, Sn, Te, Se, Hg, $Si_3N_4$, $V_2O_3$, $MX_2$ wherein M is Ti, Zr, Hf, Nb, Ta, Mo, W or Re and X is S, Se or Te, InP, InAs, GaN, GaP, GaAs, $Ga_2O_3$, ZnO, $In_2O_3$, $Na_2V_3O_7$, $Al_2O_3$, $B_2O_3$, MgO, CdO, $SiO_2$, $SnO_2$, CuO, $(SN)_x$, $Cu_2S$, $B_xC_yN_z$, $NiCl_2$, InS, ZnS, ZnSe, CdS, CdSe, $Ag_2Se$, SiC, $B_4C$, $M_2MoX_6$ wherein M is Li or Na and X is Se or Te, coated structures thereof and mixtures thereof.

For example, the aramid fibers can be short or long. For example, the aramid fibers can be in pulp or milled form.

For example the aramid fibers can be Twaron™ or Kevlar™.

For example, the rubber compositions of the disclosure can be used in the manufacture of various rubber articles including tracks, pneumatics, strips, sheets, bands, belts, hoses, linings, gaskets, guides, drive lugs, guide lugs, transmission belts, conveyor belts, a part of a pumping system, a powersection stator, etc.

For example, the composition can comprise about 15 to about 40 wt. %, about 20 to about 35 wt. %, about 25 to about 32 wt %, about 20 to about 25 wt % or about 26 to about 30 wt. % of the filler.

For example, the elastomer can comprise acrylonitrile-butadiene rubber.

For example, the elastomer can comprise hydrogenated acrylonitrile-butadiene rubber.

For example, the elastomer can comprise carboxylated acrylonitrile-butadiene rubber.

For example, the elastomer can comprise carboxylated acrylonitrile-butadiene rubber and acrylonitrile-butadiene rubber.

For example, the acrylonitrile-butadiene rubber can comprise about 15 to about 65 wt. % of acrylonitrile, about 25 to about 50 wt. % of acrylonitrile or about 30 to about 45 wt. % of acrylonitrile.

For example, the hydrogenated acrylonitrile-butadiene rubber can comprise about 15 to about 65 wt. % of acrylonitrile, about 25 to about 50 wt. % of acrylonitrile or about 30 to about 45 wt. % of acrylonitrile.

For example, the carboxylated acrylonitrile-butadiene rubber can comprise about 15 to about 65 wt. % of acrylonitrile, about 25 to about 50 wt. % of acrylonitrile or about 30 to about 45 wt. % of acrylonitrile.

For example, the composition can comprise reinforcing fibers that are aramide fibers.

For example, the composition can comprises nanometric filamentary structures that are carbon nanotubes. The carbon nanotubes can be functionalized or not.

For example, the carbon nanotubes can be multi-wall carbon nanotubes.

For example, the carbon nanotubes can be single-wall carbon nanotubes.

For example, the composition can further comprise a cross-linking agent. For example, the cross-linking agent can comprise sulphur.

For example, the composition can further comprise a cross-linking agent chosen from sulphur, metal oxides and peroxides.

For example, the composition can comprise about 0.5 to about 3.0% or about 0.5 to about 2.0% of the cross-linking agent.

For example, the composition can further comprise a plastifier.

For example, the plastifier can comprise high aromatic oil, naphtenic oil, parrafinic oil, adipates, phtalates, sebacates and mixtures thereof.

For example, the composition can comprise about 1 to about 3% or about 1.5 to about 2.5% of the plastifier.

For example, the composition can comprise about 1 to about 20% or about 2 to about 15% of the plastifier.

For example, the composition can further comprise an anti-aging agent.

For example, the anti-aging agent can comprise 1,2-dihydro-2,2,4-trimethylquinoloine, n-cyclohexyl-n'phenyl-p-phenylenediamine, zincmethylmercaptobenzimidazole, n-isopropyl-n'-phenyl-p-phenylenediamine(ippd), wingstay 100, n,n'-bis-(I ethyl.3.methylpentyl)-p-phenylffnedilsne, n-1,3-dimethylbutyl-n'-phenyl-p-phenylenediamine, octylated diphenylamine, n,n'-dyphenyl-p-phenylenediamine, 4,4'-Bis-(a,a'-dimethylbenzyl) diphenylamine ble 75, or mixtures thereof.

For example, the composition can comprise about 1.0 to about 3.0%, or about 1.5 to about 2.5% of the anti-aging agent.

For example, the composition can further comprise a fluidizing agent.

For example, the fluidizing agent can comprise a hydrocarbon resin a phenolic resin, zinc soap salts, or mixtures thereof.

For example, the composition can comprise about 0.5 to about 3.0% or about 1.0 to about 2.5% of the fluidizing agent.

For example, the composition can further comprise a rubber vulcanization accelerator agent.

For example, the rubber vulcanization accelerator agent can be chosen from diphenylguanidine, (TBBS) N-tertiary butyl-2-benzothiazolesulfenamide, (TBSI) N-t-butyl-2-benzothiazolesulfenimide, benzothyazyl-2-dicyclohexyl sulfenamide, Delac MOR, (MBS: 2-(Morpholinothio) benzothiazole sulfenamide), Delac S (CBS N-Cyclohexyl-2-benzothiazolesulfenamide) DCBS (N,N-dicyclohexyl2-benzothiazolesulfenamide) MBT (2-mercaptobenzothiazole), MBTS (Dibenzothiazoledisulfide), DPG (Diphenylguanidine), ethylene thiourea, DTDM (4,4 dithiodimorpholine, TMTM (Tetramethylthiuram monosulfide), TMTD (Tetramethylthiuram disulfide), etc. and mixtures thereof.

For example, the composition can comprise about 0.5 to about 1.5% or about 0.75 to about 1.25% of the vulcanization accelerator agent.

For example, the composition can further comprise a retarding agent.

For example, the retarding agent can be chosen from (PVI) N-(cyclohexylthio)phthalimide, retarder SAX (salicylic acid), retarder ESEN, (2-be benzozoic acid, and mixtures thereof.

For example, the composition can comprise about 0.1 to about 1.0% or about 0.2 to about 0.8% of the retarding agent.

For example, the composition can further comprise a hardening agent.

For example, the hardening be an agent chosen from phenolic resin, hexamethylnetetramine, resimene (hexamethoxymethyl/n-butyl-melamine formaldehyde resin), etc. and mixtures thereof.

For example, the composition can comprise about 0.5 to about 2.5% or about 1.0 to about 2.0% of the hardening agent.

For example, the composition can further comprise a reticulation agent.

For example, the reticulation agent can be chosen from stearic acid, zinc oxide and a mixture thereof.

For example, the composition can be an uncured rubber composition.

For example, the composition can be an uncured rubber composition having a Mooney viscosity ML 145° C. of about 10 to about 120, measured according to D-1646 standard.

For example, the composition can be an uncured rubber composition having a Mooney viscosity ML 145° C. of about 40 to about 100, measured according to D-1646 standard.

For example, the composition can be an uncured rubber composition having a Mooney viscosity ML 145° C. of about 50 to about 100, measured according to D-1646 standard.

For example, the composition can be an uncured rubber composition having a Mooney viscosity ML 145° C. of about 50 to about 80, measured according to D-1646 standard.

For example, the composition can be an uncured rubber composition having a Mooney viscosity $ML_{1+4}$ 145° C. of about 60 to about 80, measured according to D-1646 standard.

For example, the composition can be an uncured rubber composition having a Mooney Scorch time t5 145° C. of about 3 to about 10 minutes, measured according to ASTM D-1646 standard.

For example, the composition can be an uncured rubber composition having a Mooney Scorch time t5 145° C. of about 4 to about 8 minutes, measured according to ASTM D-1646 standard.

For example, the composition can be an uncured rubber composition having a Mooney Scorch time t5 145° C. of about 4 to about 6 minutes, measured according to ASTM D-1646 standard.

For example, the composition can be an uncured rubber composition having a Mooney Scorch time t5 145° C. of about 4 to about 5 minutes, measured according to ASTM D-1646 standard.

For example, the composition can be an uncured rubber composition having a specific gravity of about 1.0 to about 1.5 g/mL, measured according to ASTM D-297 standard.

For example, the composition can be an uncured rubber composition having a specific gravity of about 1.1 to about 1.2 g/mL, measured according to ASTM D-297 standard.

For example, the composition can be an uncured rubber composition having a specific gravity of about 1.10 to about 1.15 g/mL, measured according to ASTM D-297 standard.

For example, the composition can be a cured rubber composition.

For example, the composition can be a cured rubber composition having an elongation % of about 400 to about 650, measured according to ASTM D-412 standard.

For example, the composition can be a cured rubber composition having an elongation % of about 450 to about 600, measured according to ASTM D-412 standard.

For example, the composition can be a cured rubber composition having an elongation % of about 500 to about 575, measured according to ASTM D-412 standard.

For example, the composition can be a cured rubber composition having an elongation % of about 510 to about 560, measured according to ASTM D-412 standard.

For example, the composition can be a cured rubber composition having an elongation % of about 520 to about 550, measured according to ASTM D-412 standard.

For example, the composition can be a cured rubber composition having a 25% modulus of about 100 to about 500, measured according to ASTM D-412 standard.

For example, the composition can be a cured rubber composition having a 25% modulus of about 150 to about 450, measured according to ASTM D-412 standard.

For example, the composition can be a cured rubber composition having a 25% modulus of about 150 to about 300, measured according to ASTM D-412 standard.

For example, the composition can be a cured rubber composition having a 25% modulus of about 200 to about 300, measured according to ASTM D-412 standard.

For example, the composition can be a cured rubber composition having a 25% modulus of about 225 to about 275, measured according to ASTM D-412 standard.

For example, the composition can be a cured rubber composition having a cured rubber composition having a 100% modulus of about 300 to about 1500, measured according to ASTM D-412 standard.

For example, the composition can be a cured rubber composition having a cured rubber composition having a 100% modulus of about 300 to about 1000, measured according to ASTM D-412 standard.

For example, the composition can be a cured rubber composition having a cured rubber composition having a 100% modulus of about 400 to about 900, measured according to ASTM D-412 standard.

For example, the composition can be a cured rubber composition having a cured rubber composition having a 100% modulus of about 500 to about 900, measured according to ASTM D-412 standard.

For example, the composition can be a cured rubber composition having a cured rubber composition having a 100% modulus of about 700 to about 900, measured according to ASTM D-412 standard.

For example, the composition can be a cured rubber composition having a cured rubber composition having a 100% modulus of about 700 to about 850, measured according to ASTM D-412 standard.

For example, the composition can be a cured rubber composition having a cured rubber composition having a 300% modulus of about 1500 to about 3000, measured according to ASTM D-412 standard.

For example, the composition can be a cured rubber composition having a cured rubber composition having a 300% modulus of about 2000 to about 2800, measured according to ASTM D-412 standard.

For example, the composition can be a cured rubber composition having a cured rubber composition having a 300% modulus of about 2100 to about 2700, measured according to ASTM D-412 standard.

For example, the composition can be a cured rubber composition having a 300% modulus of about 2200 to about 2650, measured according to ASTM D-412 standard.

For example, the composition can be a cured rubber composition having a 300% modulus of about 2200 to about 2400, measured according to ASTM D-412 standard.

For example, the rubber composition can be a cured rubber composition and wherein the composition, when submitted to a fuel B immersion test according to ASTM D-471 standard, substantially maintains its elongation properties measured according to ASTM D-412 standard.

For example, the rubber composition can be a cured rubber composition and wherein the composition, when submitted to a fuel B immersion test according to ASTM D-471 standard, can have an elongation % of about −25% to about 25%, about −10% to about 10% or about −5% to about 5% measured according to ASTM D-412 standard, as compared to the a sample measured before fluid immersion.

For example, the rubber composition can be a cured rubber composition and wherein the composition, when submitted to a fuel B immersion test according to ASTM D-471 standard, substantially maintains its weight.

For example, the rubber composition can be a cured rubber composition and wherein the composition, when submitted to a fuel B immersion test according to ASTM D-471 standard, can have a weight variation % of about −10% to about 10% or about −5% to about 5% as compared to a sample measured before fluid immersion.

For example, the rubber composition can be a cured rubber composition and wherein the composition, when submitted to a fuel B immersion test according to ASTM D-471 standard, has a positive weight variation % of less than about 10% or of less than about 5%, as compared to a sample measured before fluid immersion.

For example, the rubber composition can be a cured rubber composition and wherein the composition, when submitted to a fuel B immersion test according to ASTM D-471 standard, can substantially maintain its hardness properties measured according to ASTM D-2240 standard.

For example, the rubber composition can be a cured rubber composition and wherein the composition, when submitted to a fuel B immersion test according to ASTM D-471 standard, can have a hardness variation % of about −15% to about 15%, about −15% to about 5%, about −15% to about 5% or about −5% to about 0% as compared to a sample measured before fluid immersion.

For example, the rubber composition can a cured rubber composition and wherein the composition, when submitted to a fuel B immersion test according to ASTM D-471 standard, can substantially maintain its tensile strength properties measured according to ASTM D-412 standard.

For example, the rubber composition can be a cured rubber composition and wherein the composition, when submitted to a fuel B immersion test according to ASTM D-471 standard, has a tensile strength variation % of about −25% to about 0%, about −15% to about 0%, about −10% to about 0% or about −5% to about 0%, as compared to a sample measured before fluid immersion.

For example, the rubber composition can be a cured rubber composition and wherein the composition can have a hardness (shore A) of about 50 to about 100, about 55 to about 95, about 60 to about 85, about 65 to about 85, about 60 to about 75, about 65 to about 70, about 66 to about 72 or about 75 to about 80, measured according to ASTM D-2240 standard.

For example, the elastomer can comprise about 25 to about 60 wt. %, about 30 to about 55 wt. %, about 45 to about 55 wt. %, about 40 to about 60 wt. %, about 45 to about 55 wt. %, about 40 to about 50 wt. % or about 46 to about 52 wt. % of acrylonitrile.

For example, the composition can further comprise talc.

For example, the composition can further comprise microcristalline talc.

For example, talc or microcrystalline talc can be present at a concentration of about 1 to about 20 wt. %, about 2 to about 15 wt. %, about 5 to about 15 wt. % or about 6 to about 12 wt. %.

For example, the composition can further comprise a clay.

For example, the composition can further comprise a nanoclay.

For example, the clay or nanoclay can be present at a concentration of about 1 to about 20 wt. %, about 2 to about 15 wt. %, about 5 to about 15 wt. %, or about 6 to about 12 wt. %.

According to another aspect, there is provided a method of manufacturing a composition as defined in the present disclosure. The method comprises:

mixing together the elastomer and the reinforcing fibers and/or nanometric filamentary structures to obtain a first mixture;

mixing together the first mixture with the filler so as to obtain a second mixture; and mixing together the second mixture with a crosslinking agent.

According to another aspect, there is provided a method of manufacturing a composition as defined in the present disclosure. The method comprises:

mixing together the elastomer and the reinforcing fibers and/or nanometric filamentary structures to obtain a first mixture;

mixing together the first mixture with the filler and optionally an anti-aging agent so as to obtain a second mixture; and mixing together the second mixture with a crosslinking agent, optionally an hardening agent, and optionally a vulcanization accelerator agent.

According to another aspect, there is provided an article comprising a rubber composition as defined in the present disclosure.

According to another aspect, there is provided a method for manufacturing an article comprising rubber, the method comprising using a rubber composition as defined in the present disclosure when moulding, extruding and/or calendering the article.

For example, the method can comprise calendering and/or extruding the rubber composition so as to obtain a rubber band, a rubber strip, a rubber log or a rubber sheet; and moulding and vulcanizing the a rubber band, a rubber strip, a rubber lug or a rubber sheet so as to obtain the article.

For example, the method can comprise calendering and/or extruding the rubber composition so as to obtain is a rubber band, a rubber strip, a rubber log or a rubber sheet; and moulding and vulcanizing a plurality of rubber bands, rubber strips, rubber lugs or rubber sheets so as to obtain the article.

For example, the moulding can be carried out by compression moulding.

For example, the article can be a rubber band, a rubber strip or a rubber sheet.

For example, the article can be a track for use on a vehicle.

For example, the article can be a snowmobile track.

For example, the article can be a tractor track.

For example, the article can be a tank track.

For example, the track can be an endless track.

For example, the article can be a tire.

For example, the article can be a gasket.

For example, the article can be a hose.

For example, the article can be a transmission belt.

For example, the article can be a tank lining.

For example, the article can be a part of a pumping system.

For example, the article can be a rubber band, a rubber strip, a rubber lug, a rubber belt or a rubber sheet.

For example, the article can be chosen from strips, sheets, bands, belts, hoses, linings, gaskets, guides, drive lugs, guide lugs, and transmission belts.

According to another aspect, there is provided a method for manufacturing an article comprising rubber, the method comprising using a rubber composition as defined in the present disclosure when moulding, extruding and/or calendering the article.

For example, the method can comprise calendering and/or extruding the rubber composition so as to obtain a rubber band, a rubber strip, a rubber log or a rubber sheet; and moulding and vulcanizing the a rubber band, a rubber strip, a rubber lug or a rubber sheet so as to obtain the article.

For example, the method can comprise calendering and/or extruding the rubber composition so as to obtain is a rubber band, a rubber strip, a rubber log or a rubber sheet; and moulding and vulcanizing a plurality of rubber bands, rubber strips, rubber lugs or rubber sheets so as to obtain the article.

For example, the moulding can be carried out by compression moulding.

The below presented examples are non-limitative and are used to better exemplify the processes of the present disclosure.

Example 1

Preparation of Rubber Composition 1

The ingredients use for the Composition 1 with their amount in phr-mass (g) per hundred grams of elastomer are represented in Table 1. The equivalents in % by weight is also presented. The Acrylonitrile-Butadiene-Polymer (NBR) was produced by Khumo. The Merge 1F770™ is a 23.5% w/w dispersion of short pulp aramid Kevlar fibers in a NBR matrix processed in liquid phase by Dupont™ inc. It is a dispersion of aramid fiber. The PRO 7000™ used is a high aspect ratio Multi Wall Carbon nanotube from Nanocyl™ sa with average wall diameter of 9.5 nm and with an average length of 1.5 microns. The carbon blacks grades used were produced from Continental™ inc. and corresponds to a N550 grade with an Iodine adsorption value of 50 mg/g and a DBP absorption value of 120 mL/100 g and a N774 grade with an Iodine adsorption value of 35 mg/g and a DBP absorption value of 75 mL/100 g.

Stearic acid and zinc oxide are used to promote reticulation of rubber during curing as well as process aids. 1,3-dimethylbutyl)-N'-phenyl-P-Phenylenediamine are used as anti-aging and anti-fatigue agents to capture free radicals. Parafin wax is used as a UV blocking agent. They were supplied by Ferguson Chemicals Inc.

N-tertiary butyl-2-benzothiazole sulfenimide was used as rubber vulcanization accelerator agent. Sulfur was used as e crosslinking agent. It was supplied by Ferguson™ Chemicals Inc.

TABLE 1

| Formulation of Rubber Composition 1 | | |
|---|---|---|
| Material | phr | (wt. %) |
| First Stage Mix | | |
| Kosyn KNB-35LM Acrylonitrile-Butadiene-Polymer (NBR) | 96.65 | 52.36 |
| MERGE 1F770 KEVLAR Engeneered Elastomer (in NBR) | 4.35 | 2.36 |
| PRO 7000 (NC 7000 MWCNT) | 2.00 | 1.08 |
| Carbon Black N-774 | 10 | 5.42 |
| Second Stage Mix Masterbatch from first stage | | |
| Carbon Black N-550 | 35 | 18.96 |
| DBEEA (Dibutoxyethoxyethyl adipate plastisizer) | 21 | 11.38 |
| Stearic Acid | 1 | 0.54 |
| Zinc Oxide | 5 | 2.71 |
| 6PPD/FLEXONE-7F N-(1,3-dimethylbutyl)-N'-phenyl-P-Phenylenediamine) | 2.5 | 1.35 |
| NOCHEK 4709A (Parafin Wax) | 3 | 1.63 |
| Third Stage Mix Masterbatch from second stage | | |
| TBBS (N-tertiary butyl-2-benzothiazole sulfenamide) | 2 | 1.08 |
| SOUFRE H-10 (Sulfur) | 2.1 | 1.14 |

Mixing and Processing Method

All the mixing phases and stages were carried in a Farrell 1.5 L Banbury mixer with Tangential rotors blending the ingredients by friction with the chamber sidewall and an hydraulic ram to put pressure to the mix. It is equipped with an automated control box permitting variable mixing speeds and an accurate control over time, pressure, energy and temperature during all the mixing process. The batch produced is then processed in a Laboratory Two Roll Mill put into sheet form and then cooled down after each mix stage. If the mix is not final, it goes back to the mixer as a masterbatch for the next mixing step 24 hours later.

The first stage mix (preparation of MasterBatch 1) was carried out as follow:

1) Add PRO 7000;
2) Add carbon black, polymer and Merge 1F770;
3) Mix Ram float at low speed (70 rpm) for 20 seconds;
4) Mix until temperature rise to 120 Celcius at 50 rpm;
5) Ram up;
6) Mix until temperature rise to 140 Celcius at low speed;
7) Ram Up; and
8) Drop 3 minutes mixing time total, thereby obtaining MasterBatch 1

The aim of this first pass mix was to break down the viscosity of the nitrile rubber as well as to force the preliminary dispersion of MWCNT, carbon black and Kevlar which is a challenge to achieve completely. It is done at high sheer with a medium drop temperature.

The second stage mix (preparation of MasterBatch 2) was done as follows:

1) Add MasterBatch 1 and chemicals (EMERY-400/VSTEARIN (Stearic Acid); ZINC OXYDE CR-4/ZOCO (Zinc Oxide); 6PPD/FLEXONE-7FN-(1,3-dimethylbutyl)-N'-phenyl-P-Phenylenediamine) and NOCHEK 4709A (Parafin Wax);
2) Add half carbon black; DBEEA (Dibutoxyethoxyethyl adipate plastisizer) and the rest of carbon black;
3) Mix to 105 Celcius at low speed;
4) Ram up;
5) Mix to 140 Celcius at low speed;
6) Drop;

4 minutes mixing time total, MasterBatch 2.

The aim of this second pass is to force by high sheer the incorporation of the reinforcing carbon black and Plasticizer and to complete the dispersion of Kevlar, MWCNT and the other chemicals.

The third stage, the finalization of mixing, was perform accordingly to the following:

1) Add MasterBatch 2 and curative chemicals (TBBS (N-tertiary butyl-2-benzothiazole sulfenamide); SOUFRE H-10 (Sulfur);
2) Mix ram down 55 sec at low speed;
3) Ram up;
5) Mix to 110 Celcius at low speed;
6) Drop;

2 minutes mixing time total, thereby obtaining composition 1 (uncured).

The mixing of the finalization is done at low sheer and low temperature. It is meant to be done to finalize the dispersion of the curative agents without beginning the cure and to avoid scorching of the product.

Example 2

Use of Rubber Composition 1 for Preparing Articles

The resulting uncured rubber Composition 1 can then be transformed in sheet form, profiles or lugs using a—two, three or four roll—calendar or an extruder equipped with a perform die, a roller head or without. The preformed material—for example a calendered uncured rubber sheet rolled of 15"×0.120"—may then be used downstream in the production process to be assembled uncured with other layers of itself, layers of other rubber compounds with different properties (hardness) and along with other reinforcing non rubber material, using the natural tack of the rubber or with the use of adhesives or tack cement. It is then cured in a final product by compression moulding, injection, transfer or autoclave. This operation consists of heating the rubber under a certain temperature (about 140° C. to about 180° C.) to make the sulphur creates crosslinks between polymer chains—the curing process that gives to the rubber its final stable elastic properties—at high pressure to remove gas in a product form directed by the moulds form. For example, these products can be used to in the manufacture of hoses, tank liners, power section stators designed for oil and gas prospection applications, but it may also be used to manufacture rubber pieces for other applications, like the mining industry, tank lining, tires (of all kind and sizes), hoses, gaskets and all other rubber goods.

These compositions can thus be used, for example, in oil sands pipes. The interior is covered with a rubber liner that must be resistant to the immersion in oil as well as being resistant to excessive wear and abrasion. In addition, for powers stator applications, the resistance to excessive heat and pressure due to deep ground forencing. The technology claimed improves drastically all of them and moreover the final field performance. It is likely to do the same for all highly demanding applications were thermal, oil, chuncking and wear resistance like OTR tires, mining ball mills and conveyors, specialty hoses, etc.

Example 3

Preparation of Various Rubber Compositions

Similarly to Composition 1, previously discussed, other compositions (Compositions 2 and 3) have been prepared by using the same method. Their ingredients are listed in Table 2 below.

TABLE 2

Ingredients of Various Rubber Compositions

| Trade Name | Chemical Formula | Composition 1 (NBR 100, CNT, kevlar) | | Composition 2 (HNBR 100, CNT, kevlar) | | Composition 3 (XNBR 100, CNT, kevlar) | |
|---|---|---|---|---|---|---|---|
| | | phr | % w/w | phr | % w/w | phr | % w/w |
| Kosyn KNB-35LM | Acrylonitrile-Butadiene-Polymer (NBR) | 96.65 | 52.36% | | | | |
| Therban 4364 VP | Hydrogenated Acrylonitrile-Butadiene-Polymer (HNBR) | | | 97.970 | 53.68% | | |
| Nipol NX-775 | Carboxylated Acrylonitrile-Butadiene-Polymer (XNBR) | | | | | 96.650 | 53.83% |
| MERGE 1F770 | KEVLAR Engeneered Elastomer (in NBR) | 4.35 | 2.36% | | | | |
| MERGE 1F1598 | KEVLAR Engeneered Elastomer (in HNBR) | | | 3.030 | 1.66% | 4.350 | 2.42% |
| PRO 7000 | NC 7000 MWCNT | 2 | 1.08% | 2.000 | 1.10% | 2.000 | 1.11% |
| Carbon Black N-330 | Carbon Black | | | | | 35.000 | 19.49% |
| Carbon Black N-550 | Carbon Black | 35 | 18.96% | | | | |
| Carbon Black N-774 | Carbon Black | 10 | 5.42% | 35.000 | 19.18% | | |
| Barythes 22 | Barium Sulfate | | | 10.000 | 5.48% | | |
| DBEEA | Dibutoxyethoxyethyl adipate plastisizer | 21 | 11.38% | | | 15.000 | 8.35% |
| DOP | Dioctyl Phtalate | | | 17.000 | 9.32% | | |
| Degussa Si-69 | Bis (triethoxysilylpropyl) polysulfide | | | 2.000 | 1.10% | | |
| Nipol 1312 L/V | Acrylonitrile-Butadiene-Polymer (NBR) Low Molecular weight | | | | | 7.000 | 3.90% |
| Stearic Acid | Stearic acid | 1 | 0.54% | 1.000 | 0.55% | 1.000 | 0.56% |
| Zinc Oxide | Zinc Oxide | 5 | 2.71% | 5.000 | 2.74% | 5.000 | 2.78% |
| Pluriol E4000 | Polyethylene Glycol | | | 1.000 | 0.55% | | |
| TMQ | 1,2-Dihydro-2,2,4-trimethylquinoline | | | | | 1.000 | 0.56% |
| 6PPD | N-cyclohexyl-N'-phenyl-p-phenylenediamine | 2.5 | 1.35% | | | | |
| Naugard 445 | 4,4'-Bis-(a,a'-dimethylbenzyl) diphenylamine | | | 1.500 | 0.82% | | |
| Vanox ZMTI | Zincmethylmercaptobenzimidazole | | | 1.000 | 0.55% | | |
| NOCHEK 4709A, Blended Waxe | Paraffin Wax | 3 | 1.63% | | | | |
| Cumar P-25 DLD (KD-109) | Coumarone Indene Resin | | | | | 10.000 | 5.57% |
| TMTD | Tetramethyl thiuram disulfide | | | 4.000 | 2.19% | 0.300 | 0.17% |
| TBBS | N-tertiary butyl-2-benzothiazole sulfenamide | 2 | 1.08% | | | | |

TABLE 2-continued

Ingredients of Various Rubber Compositions

| Trade Name | Chemical Formula | Composition 1 (NBR 100, CNT, kevlar) | | Composition 2 (HNBR 100, CNT, kevlar) | | Composition 3 (XNBR 100, CNT, kevlar) | |
|---|---|---|---|---|---|---|---|
| | | phr | % w/w | phr | % w/w | phr | % w/w |
| MBTS | Benzothyazyl disulfide | | | | | 1.500 | 0.84% |
| Sulphur | Sulphur | 2.1 | 1.14% | 2.000 | 1.10% | 0.750 | 0.42% |
| Total | | 184.60 | 100.00% | 182.50 | 100.00% | 179.55 | 100.00% |

Example 4

Comparative Tests for Various Rubber Compositions

Compositions 1 to 3 have been tested. The physical properties of Compositions 1 to 3 are listed in Table 3.

TABLE 3

Physical Properties of Various Rubber Compositions

| | Tested Compositions | | |
|---|---|---|---|
| Tests | Composition 1 (NBR 100, CNT, kevlar) | Composition 2 (HNBR 100, CNT, kevlar) | Composition 3 (XNBR 100, CNT, kevlar) |
| Specific Gravity (g/mL) | 1.164 | 1.170 | 1.147 |
| Hardness (dureté shore A) | 66 | 72 | 71 |
| Tensile (psi) | 1863 | 3018 | 1959 |
| Elongation (%) | 302 | 436 | 428 |
| Modulus 50% | 496 | 592 | 465 |
| Modulus 100% | 823 | 846 | 706 |
| Modulus 300% | 1849 | 1731 | 1303 |
| Tear (lbs, die C) | 200 | 239 | 204 |
| MDR 191C ML | 0.65 | 0.36 | 0.93 |
| MDR 191C t10 | 0.71 | 0.8 | 0.55 |
| MDR 191C t95 | 1.86 | 3.33 | 3.12 |
| MDR 191C MH | 14.72 | 13.77 | 5.78 |
| Viscosity ML 145 C. | 18 | 12 | 24 |
| Scorch T-5 145 C. | 6.75 | 5.18 | 5.61 |
| DIN Abrasion (mm3) | 114 | 163 | 130 |

Specific Gravity has been measured according to ASTM D-297 standard. Hardness has been measured according to ASTM D-2240 standard with a Bareiss Durometer. Tensile strength, elongation at break and modulus has been measured according to ASTM D-412 standard with a TensiData tensiometer. Tear propagation strength was measured according to ASTM standard D-624 die C with a TensiData tensiometer.

MDR and viscosimetry have been tested using standards ASTM D-2084 and D-1646 respectively. The aim of these tests are to understand the processing behaviour of the uncured rubber paste to optimise calendering and extrusion as well as to understand and control the curing kinetics (slow curing or fast curing) during mould vulcanization.

DIN abrasion test has been evaluated with a Bareiss DIN abrader instrument according to ASTM D-5963 method and was meant to measure the resistance of the material to wear with the presence of sands and mud. Heat aging have been tested using standard ASTM D-573 to measure the deterioration of the rubber into a hot air oven at 100° C. for a period of time of 70 hours. The aim of this test was to evaluate the thermal resistance and aging properties of the composition. Such a property is quite important to powersection stators application.

Oil immersion have been evaluated in regards to ASTM D-412 and D-471 standards with a TensiData tensiometer. Immersions were performed using ASTM D-471 standard method with oil IRM903 (former oil ASTM 3) to evaluate the oil resistance properties. Variations in tensile-strain properties were then measured on dumbels that has been immersed. In oil and gas applications, resistance properties of the rubber compound to fluids is primordial.

Aging (Heat and Oil) Test Results

Further tests have been made on compositions 1 to 3 and are shown in Table 5. More particularly, comparatives tests have been made with Compositions 1 to 3 by comparing them with Compositions A, B and C. Compositions A, B and C are similar to compositions 1, 2 and 3, respectively, with the exception that they do not comprises the reinforcing fibers and the nanometric filamentary structures of the compositions 1, 2 and 3. The Compositions A, B and C are described in Table 4. In Table 5, the Compositions 1 to 3 and A to C have been compared. In order to do so, sheets have been made with these compositions. Sheet 1 has been made with Composition A, sheet 2 has been made with Composition 1, sheet 3 has been made with Composition B, sheet 4 has been made with Composition 2, sheet 5 has been made with Composition C and sheet 6 has been made with Composition 3.

TABLE 4

Ingredients of Various Comparative Compositions

| Trade Name | Chemical Formula | Composition-A (NBR 100, Reference, Oil and Gas Product) | | Composition-1 (NBR 100, CNT, kevlar, oil and Gas Product) | | Composition-B (HNBR 100, Reference, Oil and Gas Product) | |
|---|---|---|---|---|---|---|---|
| | | phr | % w/w | phr | % w/w | phr | % w/w |
| Kosyn KNB-35LM | Acrylonitrile-Butadiene-Polymer (NBR) | 100 | 53.59% | 96.65 | 52.36% | | |
| Therban 4364 VP | Hydrogenated Acrylonitrile-Butadiene-Polymer (HNBR) | | | | | 100.000 | 55.71% |

TABLE 4-continued

Ingredients of Various Comparative Compositions

| Trade Name | Chemical Formula | phr | % w/w | phr | % w/w | phr | % w/w |
|---|---|---|---|---|---|---|---|
| Nipol NX-775 | Carboxylated Acrylonitrile-Butadiene-Polymer (XNBR) | | | | | | |
| MERGE 1F770 | KEVLAR Engeneered Elastomer (in NBR) | | | 4.35 | 2.36% | | |
| MERGE 1F1598 | KEVLAR Engeneered Elastomer (in HNBR) | | | | | | |
| PRO 7000 | NC 7000 MWCNT | | | 2 | 1.08% | | |
| Carbon Black N-330 | Carbon Black | | | | | | |
| Carbon Black N-550 | Carbon Black | 40 | 21.44% | 35 | 18.96% | | |
| Carbon Black N-774 | Carbon Black | 10 | 5.36% | 10 | 5.42% | 35.000 | 19.50% |
| Barythes 22 | Barium Sulfate | | | | | 10.000 | 5.57% |
| DBEEA | Dibutoxyethoxyethyl adipate plastisizer | 21 | 11.25% | 21 | 11.38% | | |
| DOP | Dioctyl Phtalate | | | | | 17.000 | 9.47% |
| Degussa Si-69 | Bis (triethoxysilylpropyl) polysulfide | | | | | 2.000 | 1.11% |
| Nipol 1312 L/V | Acrylonitrile-Butadiene-Polymer (NBR) Low Molecular weight | | | | | | |
| Stearic Acid | Stearic acid | 1 | 0.54% | 1 | 0.54% | 1.000 | 0.56% |
| Zinc Oxide | Zinc Oxide | 5 | 2.68% | 5 | 2.71% | 5.000 | 2.79% |
| Pluriol E4000 | Polyethylene Glycol | | | | | 1.000 | 0.56% |
| TMQ | 1,2-Dihydro-2,2,4-trimethylquinoline | | | | | | |
| 6PPD | N-cyclohexyl-N'-phenyl-p-phenylenediamine | 2.5 | 1.34% | 2.5 | 1.35% | | |
| Naugard 445 | 4,4'-Bis-(a,a'-dimethylbenzyl) diphenylamine | | | | | 1.500 | 0.84% |
| Vanox ZMTI | Zincmethylmercaptobenzimidazole | | | | | 1.000 | 0.56% |
| NOCHEK 4709A, Blended Waxe | Paraffin Wax | 3 | 1.61% | 3 | 1.63% | | |
| Cumar P-25 DLD (KD-109) | Coumarone Indene Resin | | | | | | |
| TMTD | Tetramethyl thiuram disulfide | | | | | 4.000 | 2.23% |
| TBBS | N-tertiary butyl-2-benzothiazole sulfenamide | 2 | 1.07% | 2 | 1.08% | | |
| MBTS | Benzothyazyl disulfide | | | | | | |
| Sulphur | Sulphur | 2.1 | 1.13% | 2.1 | 1.14% | 2.000 | 1.11% |
| Total | | 186.60 | 100.00% | 184.60 | 100.00% | 179.50 | 100.00% |

| | | Composition-2 (HNBR 100, CNT, kevlar, oil and Gas Product) | | Composition-C (XNBR 100, Reference, Oil and Gas Product) | | Composition-3 (XNBR 100, CNT, kevlar, Oil and Gas Product) | |
|---|---|---|---|---|---|---|---|
| Trade Name | Chemical Formula | phr | % w/w | phr | % w/w | phr | % w/w |
| Kosyn KNB-35LM | Acrylonitrile-Butadiene-Polymer (NBR) | | | | | | |
| Therban 4364 VP | Hydrogenated Acrylonitrile-Butadiene-Polymer (HNBR) | 97.970 | 53.68% | | | | |
| Nipol NX-775 | Carboxylated Acrylonitrile-Butadiene-Polymer (XNBR) | | | 100.000 | 55.08% | 96.650 | 53.83% |
| MERGE 1F770 | KEVLAR Engeneered Elastomer (in NBR) | | | | | | |
| MERGE 1F1598 | KEVLAR Engeneered Elastomer (in HNBR) | 3.030 | 1.66% | | 0.00% | 4.350 | 2.42% |
| PRO 7000 | NC 7000 MWCNT | 2.000 | 1.10% | | 0.00% | 2.000 | 1.11% |
| Carbon Black N-330 | Carbon Black | | | 40.000 | 22.03% | 35.000 | 19.49% |
| Carbon Black N-550 | Carbon Black | | | | | | |
| Carbon Black N-774 | Carbon Black | 35.000 | 19.18% | | | | |
| Barythes 22 | Barium Sulfate | 10.000 | 5.48% | | | | |
| DBEEA | Dibutoxyethoxyethyl adipate plastisizer | | | 15.000 | 8.26% | 15.000 | 8.35% |
| DOP | Dioctyl Phtalate | 17.000 | 9.32% | | | | |
| Degussa Si-69 | Bis (triethoxysilylpropyl) polysulfide | 2.000 | 1.10% | | | | |
| Nipol 1312 L/V | Acrylonitrile-Butadiene-Polymer (NBR) Low Molecular weight | | | 7.000 | 3.86% | 7.000 | 3.90% |
| Stearic Acid | Stearic acid | 1.000 | 0.55% | 1.000 | 0.55% | 1.000 | 0.56% |
| Zinc Oxide | Zinc Oxide | 5.000 | 2.74% | 5.000 | 2.75% | 5.000 | 2.78% |
| Pluriol E4000 | Polyethylene Glycol | 1.000 | 0.55% | | | | |
| TMQ | 1,2-Dihydro-2,2,4-trimethylquinoline | | | 1.000 | 0.55% | 1.000 | 0.56% |
| 6PPD | N-cyclohexyl-N'-phenyl-p-phenylenediamine | | | | | | |
| Naugard 445 | 4,4'-Bis-(a,a'-dimethylbenzyl) diphenylamine | 1.500 | 0.82% | | | | |
| Vanox ZMTI | Zincmethylmercaptobenzimidazole | 1.000 | 0.55% | | | | |
| NOCHEK 4709A, Blended Waxe | Paraffin Wax | | | | | | |
| Cumar P-25 DLD (KD-109) | Coumarone Indene Resin | | | 10.000 | 5.51% | 10.000 | 5.57% |
| TMTD | Tetramethyl thiuram disulfide | 4.000 | 2.19% | 0.300 | 0.17% | 0.300 | 0.17% |
| TBBS | N-tertiary butyl-2-benzothiazole sulfenamide | | | | | | |
| MBTS | Benzothyazyl disulfide | | | 1.500 | 0.83% | 1.500 | 0.84% |
| Sulphur | Sulphur | 2.000 | 1.10% | 0.750 | 0.41% | 0.750 | 0.42% |
| Total | | 182.50 | 100.00% | 181.55 | 100.00% | 179.55 | 100.00% |

TABLE 5

Tests made on Composition 1

| Compounds Tests | | Sheet 1-Composition-A (NBR 100, Reference) | Sheet 2-Composition-1 (NBR 100, CNT, kevlar) | Sheet 3-Composition-B (HNBR 100, Reference) | Sheet 4-Composition-2 (HNBR 100, CNT, kevlar) | Sheet 5-Composition-C (XNBR 100, Reference) | Sheet 6-Composition-3 (XNBR 100, CNT, kevlar) |
|---|---|---|---|---|---|---|---|
| Specific Gravity | (g/mL) | 1.165 | 1.164 | 1.177 | 1.170 | 1.155 | 1.147 |
| Hardness | (shore A) | 61 | 66 | 62 | 72 | 68 | 71 |
| Tensile | (psi) | 1749 | 1863 | 3599 | 3018 | 1781 | 1959 |
| Elongation | (%) | 321 | 302 | 452 | 436 | 423 | 428 |
| Modulus 50% | (psi) | 108 | 496 | 209 | 592 | 244 | 465 |
| Modulus 100% | (psi) | 398 | 823 | 333 | 846 | 377 | 706 |
| Modulus 300% | (psi) | 1696 | 1849 | 1420 | 1731 | 1173 | 1303 |
| Tear | (lbs die C) | 185 | 200 | 188 | 239 | 177 | 204 |
| MDR 191 C. | ML | 0.32 | 0.65 | 0.1 | 0.36 | 0.69 | 0.93 |
| | t10 | 0.72 | 0.71 | 0.86 | 0.8 | 0.57 | 0.55 |
| | t95 | 1.85 | 1.86 | 3.31 | 3.33 | 3.15 | 3.12 |
| | MH | 12.46 | 14.72 | 11.74 | 13.77 | 5.04 | 5.78 |
| Viscosity ML 145 C. | Mooney | 12 | 18 | 7 | 12 | 18 | 24 |
| Scorch T-5 145 C. | minutes | 8.28 | 6.75 | 5.87 | 5.18 | 5.53 | 5.61 |
| DIN Abrasion | (mm3) | 115 | 114 | 162 | 163 | 122 | 130 |
| Heat Aging (70 h/100 C.) | Hardness difference | 6 | 6 | 7 | 5 | 10 | 9 |
| | Tensile difference (%) | 8.3 | −8.1 | −26.8 | −19.5 | 48.6 | 29.7 |
| | Elongation difference (%) | −14.6 | −28.5 | −37.2 | −46.3 | −15.1 | −19.4 |
| Fluid Immersion (IRM 903; 70 h/100 C.) | Hardness difference | 2 | 0 | 3 | 2 | 4 | 1 |
| | Tensile difference (%) | −22.6 | −37.9 | −55.3 | −43 | 2.5 | −2.3 |
| | Elongation difference (%) | −43 | −58.6 | −45.1 | −52.5 | −32.4 | −32.5 |
| | Volume difference (%) | 1.4 | 3.8 | −1.1 | −0.7 | 6.4 | 6.6 |
| | Weight difference (%) | −0.1 | 2.1 | −2.2 | −1.8 | 4.1 | 4.4 |

The comparison of Compositions A to C with the Compositions 1 to 3, their counterparts with the same ingredients plus PRO 7000 and Kevlar Fiber, show interesting behaviour of the materials. The fact of adding MWCNT and aramid fibers exhibit a significant increase in the hardness and modulus when performing the stress-strain test without losing much elongation and tensile strength. The integration of these results thus show that the material with these additives are stronger and tougher. Moreover, the other physical and dynamic properties are not negatively affected by the additives. The DIN abrasion resistances are unchanged as well as heat resistance and immersion-swell resistance properties. This was unexpected since, usually, increasing hardness and modulus with conventional means—polymers, fillers and curative chemicals—is known to be detrimental to these properties, especially abrasion resistance. Briefly, applicants have obtained and tested tougher and more rigid materials, but that surprisingly keep the advantages of softer materials with comparable matrix elastomer. This is usually required for the use in demanding oil and gas applications were resistance to wear, heat and pressure are needed, like the powersection stators.

Example 4

Fuel Immersion Test for Various Rubber Compositions

Some tests have been made in order to verify the resistance properties of the compositions when submitted to liquids such as fuel. For example, such compositions can be used for making products that are in contacts with fuel. For example, such products can be fuel tank lining. These tests have been made in accordance with Fuel B immersion test according to ASTM D-471.

Compositions 4, 5 and 6 have been prepared have been prepared by using the same method as previously described for Composition 1. Their ingredients are listed in Table 6 below and the results of such tests are shown in Table 7.

TABLE 6

Ingredients of Various Comparative Compositions

| Trade Name | Chemical Formula | Composition-4 (NBR 100,, CNT, kevlar, military fuel tank lining) | | Composition-5 (NBR 100,, CNT, kevlar, military fuel tank lining) | | Composition-6 (NBR 100,, CNT, kevlar, military fuel tank lining) | |
|---|---|---|---|---|---|---|---|
| | | phr | % w/w | phr | % w/w | phr | % w/w |
| Kosyn KNB-35LL | Acrylonitrile-Butadiene-Polymer (NBR) | 96.65 | 41.80% | | | | |
| Paracril CJLT | Acrylonitrile-Butadiene-Polymer (NBR) | | | 96.63 | 50.26% | | |
| Krynac 4975 | Acrylonitrile-Butadiene-Polymer (NBR) | | | | | 96.640 | 43.52% |
| SBR 1502 | Styrene-Butadiene Rubber | 19.94 | 8.62% | | | | |
| MERGE 1F770 | KEVLAR Engeneered Elastomer (in NBR) | 4.35 | 1.88% | 4.37 | 2.27% | 4.37 | 1.97% |
| PRO 7000 | NC 7000 MWCNT | 2 | 0.86% | 2 | 1.04% | 2.02 | 0.91% |
| Carbon Black N-550 | Carbon Black | 80 | 34.60% | 67 | 34.85% | 67.00 | 30.17% |
| Mistron Vapor R Compacted | Microcristalline talc | | | | | 20.00 | 9.01% |
| TP-90B | Hexaoxatricosane | | | | | 19.00 | 8.56% |

TABLE 6-continued

Ingredients of Various Comparative Compositions

| Trade Name | Chemical Formula | Composition-4 (NBR 100,, CNT, kevlar, military fuel tank lining) | | Composition-5 (NBR 100,, CNT, kevlar, military fuel tank lining) | | Composition-6 (NBR 100,, CNT, kevlar, military fuel tank lining) | |
|---|---|---|---|---|---|---|---|
| | | phr | % w/w | phr | % w/w | phr | % w/w |
| DOA | Dioctyl Adipate | 11 | 4.76% | | | | |
| DBS | Dibutyl Sebacate | | | 9.2 | 4.79% | | |
| Stearic Acid | Stearic acid | 1 | 0.43% | 1 | 0.52% | 1.00 | 0.45% |
| Zinc Oxide | Zinc Oxide | 5 | 2.16% | 4.2 | 2.18% | 4.20 | 1.89% |
| 6PPD | N-cyclohexyl-N'-phenyl-p-phenylenediamine | 2 | 0.86% | 1.7 | 0.88% | 1.70 | 0.77% |
| NOCHEK 4709A, Blended Waxe | Paraffin Wax | 3 | 1.30% | 2.5 | 1.30% | 2.50 | 1.13% |
| Struktol WB-222 | Blend of proprietary fatty acids | 2 | 0.86% | | | | |
| TBBS | N-tertiary butyl-2-benzothiazole sulfenamide | 1.9 | 0.82% | 1.6 | 0.83% | 1.60 | 0.72% |
| CTP-PVI | Retarding agent | 0.4 | 0.17% | 0.35 | 0.18% | 0.35 | 0.16% |
| Sulphur | Sulphur | 2 | 0.86% | 1.7 | 0.88% | 1.70 | 0.77% |
| Total | | 231.24 | 100.00% | 192.25 | 100.00% | 222.08 | 100.00% |

TABLE 7

Fuel Immersion Tests made on Compositions 4, 5 and 6

| Tests | | Sheet 4-Composition-4 (NBR 100,, CNT, kevlar) | Sheet 5-Composition-5 (NBR 100,, CNT, kevlar) | Sheet 6-Composition-6 (NBR 100,, CNT, kevlar) |
|---|---|---|---|---|
| Specific Gravity | (g/mL) | 1.208 | 1.221 | 1.274 |
| Hardness | (shore A) | 78 | 78 | 80 |
| Tensile | (psi) | 2088 | 2701 | 2268 |
| Elongation | (%) | 379 | 348 | 273 |
| Modulus 100% | (psi) | 1173 | 1328 | 1395 |
| Modulus 300% | (psi) | na | 2575 | na |
| Tear | (lbs, die C) | 222 | 266 | 201 |
| MDR 191 C | ML | 1.54 | 1.71 | 2.20 |
| | t10 | 0.94 | 0.77 | 0.66 |
| | t95 | 2.62 | 2.25 | 1.62 |
| | MH | 18.06 | 18.78 | 16.42 |
| Viscosity ML 145 C. | Mooney | 29 | 43 | 42 |
| Scorch T-5 145 C. | minutes | 10.49 | 6.55 | 6.87 |
| Fuel Immersion (Reference Fuel B; 72 h/23 C.) | Hardness difference (%) | −14 | −6 | 0 |
| | Tensile difference (%) | −37.5 | −21.7 | −4.9 |
| | Elongation difference (%) | −39.2 | −25.6 | 4.8 |
| | Volume difference (%) | 33.9 | 9.0 | 0.1 |
| | Weight difference (%) | 21.6 | 5.8 | −0.6 |

The results of Fuel B immersion test according to ASTM D-471 shown in Table 7 clearly demonstrate that the compositions of the present disclosure can be useful for preparing products that are resistant to fuel. In the present case, the Fuel B was a mixture of isooctane (70%) and toluene (30%). The different acrylonitrile-butadiene polymers used in Compositions 4, 5 and 6 had different concentrations of acrylonitrile. In fact, Kosyn KNB-35LL has an acrylonitrile concentration of about 34 wt %, while Paracril CJLT has an acrylonitrile concentration of about 40 wt %, and Krynac 4975 has an acrylonitrile concentration of about 49 wt %. Without wishing to be bound to such a theory, it seems that, at least within those results, higher quantity of acrylonitrile allowed for better results since the polar nitrile groups are efficient for preventing non-polar solvents from entering into the composition.

For all these reasons, it was found that the compositions of the present disclosure were very durable in applications related to oil and gas industry and mining industry. Such compositions can thus be useful for manufacturing various rubber products used in such fields as well as in various other fields.

The Applicant hereby submits that the person skilled in the art would clearly understand that the various embodiments presented in paragraphs [0024] to [00188], when applicable, can be combined in all possible manners and be applied to the compositions recited in paragraphs [0008] to [0020]. The embodiments of paragraphs [0024] to [00188] of the present disclosure are presented in such a manner in the present disclosure so as to demonstrate that every combinations of embodiments, when applicable, can be made. These embodiments have thus been presented in a manner equivalent to making dependent claims for all the embodiments that depend upon any of the preceding claims (covering the previously presented embodiments), thereby demonstrating that they can be combined together.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A rubber composition comprising:
   about 40 to about 70 wt. % of an elastomer comprising a rubber selected from the group consisting of acrylonitrile-butadiene, hydrogenated acrylonitrile-butadiene, carboxylated acrylonitrile-butadiene and mixtures thereof;
   about 0.1 to about 10 wt. % of reinforcing fibers that are aramid fibers;
   about 0.1 to about 10 wt. % of nanometric filamentary structures that are carbon nanotubes, said nanometric filamentary structures being functionalized or unfunctionalized; and
   about 15 to about 40 wt. % of a filler selected from the group consisting of carbon black, silica and a mixture thereof, wherein said rubber composition is a cured rubber composition having an elongation % of about 302 to about 650, measured according to ASTM D-412 standard.

2. The composition of claim 1, wherein in said composition, said elastomer, reinforcing fibers and/or nanometric filamentary structures and filler are substantially uniformly distributed.

3. The composition of claim 2, wherein said composition comprises about 45 to about 65 wt. % of said elastomer.

4. The composition of claim 2, wherein said composition comprises about 50 to about 60 wt. % of said elastomer.

5. The composition of claim 1, wherein said composition comprises about 0.25 to about 1.75 wt. % of said reinforcing fibers.

6. The composition of claim 5, wherein said composition comprises about 0.25 to about 1.75 wt. % of said nanometric filamentary structures.

7. The composition of claim 1, wherein said composition comprises about 0.5 to about 10 wt. % of said reinforcing fibers and/or nanometric filamentary structures.

8. The composition of claim 2, wherein said composition comprises about 1 to about 5 wt. % of said reinforcing fibers and/or nanometric filamentary structures.

9. The composition of claim 8, wherein said composition comprises about 20 to about 35 wt. % of said filler.

10. A rubber composition comprising:
an elastomer comprising a rubber selected from the group consisting of acrylonitrile-butadiene, hydrogenated acrylonitrile-butadiene, carboxylated acrylonitrile-butadiene and mixtures thereof;
reinforcing fibers that are aramid fibers;
nanometric filamentary structures that are carbon nanotubes, said nanometric filamentary structures being functionalized or unfunctionalized; and
a filler selected from the group consisting of carbon black, silica, and a mixture thereof,
wherein said rubber composition is a cured rubber composition having an elongation % of about 302 to about 650, measured according to ASTM D-412 standard; and a 100% modulus of about 300 to about 1500 measured according to ASTM D-412 standard.

11. A rubber composition comprising:
an elastomer comprising a rubber selected from the group consisting of acrylonitrile-butadiene, hydrogenated acrylonitrile-butadiene, carboxylated acrylonitrile-butadiene and mixtures thereof;
reinforcing fibers that are aramid fibers;
nanometric filamentary structures that are carbon nanotubes, said nanometric filamentary structures being functionalized or unfunctionalized; and
a filler selected from carbon black, silica, and a mixture thereof,
wherein said rubber composition is a cured rubber composition having an elongation % of about 302 to about 650, measured according to ASTM D-412 standard, a 100% modulus of about 300 to about 1500 psi measured according to ASTM D-412 standard, and a 300% modulus of about 1303 to about 3000 psi, measured according to ASTM D-412 standard.

12. The composition of claim 7, wherein said elastomer comprises hydrogenated acrylonitrile-butadiene.

13. The composition of claim 7, wherein said elastomer comprises carboxylated acrylonitrile-butadiene.

14. The composition of claim 1, wherein said composition has, prior to curing, a Mooney viscosity ML 145° C. of about 50 to about 100, measured according to ASTM D-1646 standard.

15. The composition of claim 1, wherein said composition has, prior to curing, a Mooney Scorch time t5 145° C. of about 4 to about 8 minutes, measured according to ASTM D-1646 standard.

16. The composition of claim 7, wherein said composition has, prior to curing, a specific gravity of about 1.0 to about 1.5 g/mL, measured according to ASTM D-297 standard.

17. The composition of claim 1, wherein said rubber composition has a 100% modulus of about 300 to about 1500 psi measured according to ASTM D-412 standard.

18. The composition of claim 7, wherein said rubber composition has a 100% modulus of about 400 to about 900 psi, measured according to ASTM D-412 standard.

19. The composition of claim 17, wherein said rubber composition has a 300% modulus of about 1500 to about 3000 psi, measured according to ASTM D-412 standard.

20. The composition of claim 1, wherein said rubber composition, when submitted to a fuel B immersion test according to ASTM D-471 standard, has an elongation % of about −10% to about 10%, measured according to ASTM D-412 standard, as compared to a sample measured before fluid immersion.

21. An article comprising a rubber composition as defined in claim 1.

* * * * *

UNITED STATES PATENT AND TRADEMARK OFFICE
CERTIFICATE OF CORRECTION

PATENT NO. : 9,840,611 B2
APPLICATION NO. : 15/028433
DATED : December 12, 2017
INVENTOR(S) : Bédard et al.

Page 1 of 1

It is certified that error appears in the above-identified patent and that said Letters Patent is hereby corrected as shown below:

In the Claims

Claim 10, Column 23, Line 40, "1500 measured according to according to ASTM D-412 standard." should read -- 1500 psi, measured according to ASTM D-412 standard. --;

Claim 17, Column 24, Line 31, "1500 psi measured according to according to ASTM D-412 standard." should read -- 1500 psi, measured according to ASTM D-412 standard. --.

Signed and Sealed this
Twenty-second Day of May, 2018

Andrei Iancu
*Director of the United States Patent and Trademark Office*